# 3,075,019
SULFURIZATION OF ALIPHATIC SULFIDES
Irving D. Webb, Yorba Linda, Calif., assignor, by mesne assignments, to Collier Carbon and Chemical Corporation, a corporation of California
No Drawing. Filed May 19, 1958, Ser. No. 735,994
11 Claims. (Cl. 260—608)

This invention relates to a process for the sulfurization of aliphatic sulfides, and in particular concerns an improved method for combining elemental sulfur with dialkyl sulfides to obtain organic products containing a high proportion of chemically bound sulfur.

Organic compounds or products containing relatively large amounts of chemically bound sulfur are widely employed as vulcanization accelerators and in the compounding of extreme pressure lubricants. More recently, certain of such products have been found to be effective fungicides, nematocides and bactericides. One type of such product or compound is that obtained by heating a dialkyl mono- or poly-sulfide with elemental sulfur under such conditions of time and temperature that the sulfur combines chemically with the dialkyl sulfide and is not precipitated from the reaction mixture upon cooling the same to a low temperature. Such mode of preparation, however, is not always satisfactory from the standpoint of inducing large amounts of sulfur to combine with the sulfide reactant and/or inducing even moderate amounts of sulfur to react at desirably low temperatures and in short reaction times.

I have now found that in reacting dialkyl sulfides with elemental sulfur to form products containing increased amounts of chemically combined sulfur, the reaction may advantageously be promoted by carrying it out in the presence of a catalytic amount of a Friedel-Crafts catalyst. The use of such a catalyst in accordance with the invention permits large amounts of sulfur to be readily introduced into organic sulfides at relatively low temperatures and short reaction times.

As stated, the process of the invention is applicable to the sulfurization of dialkyl mono- and polysulfides to form sulfurized products in accordance with the reaction equation:

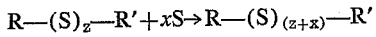
$$R—(S)_z—R' + xS \rightarrow R—(S)_{(z+x)}—R'$$

wherein R and R' each represents an alkyl radical, e.g., methyl, ethyl, propyl, octyl, heptadecyl, eicosyl, etc., $x$ represents an integer having a value from 1 to 15 and $z$ represents an integer having a value from 1 to 4, inclusive. As examples of the dialkyl sulfides to which the process of the invention is applicable there may be mentioned dimethyl monosulfide, diethyl disulfide, methyl n-propyl disulfide, di-isopropyl tetrasulfide, n-butyl n-amyl disulfide, di-octyl trisulfide, di-decyl mono-sulfide, methyl tetradecyl trisulfide, ethyl eicosyl disulfide, di-isobutyl tetrasulfide, di-n-heptyl monosulfide, amyl octyl trisulfide, etc. Mixtures of such dialkyl sulfides may also be employed. The catalysts which are employed in accordance with the invention are those metal salts of the group commonly referred to as Friedel-Crafts catalysts, e.g., zinc chloride, ferric bromide, stannic chloride, aluminum chloride, mercuric chloride, boron trifluoride, etc. A zinc halide, particularly zinc chloride, is preferred.

The proportions in which the respective reactants are employed depend upon the identity of the same and upon the degree of sulfurization desired. Certain of the dialkyl sulfides, notably the dialkyl disulfides of relatively low molecular weight, readily combine with as many as 15 atoms of sulfur per molecule of the dialkyl sulfide, whereas others can be combined, even by the present process, with only about 5 sulfur atoms per molecule. Consequently, the reactant proportions may be varied over relatively wide limits, e.g., from as little as about 1 atomic weight to as much as 15 or more atomic weights of sulfur per molecular weight of the organic sulfide. Should the dialkyl sulfide be one incapable of reacting with all of the sulfur provided, the excess sulfur will deposit out of solution in the reaction product when the latter is cooled (e.g., to about 0° C.), and can readily be removed from the cooled product by filtration. Also, if desired, the sulfur may purposely be employed in excess in order to promote the formation of more highly sulfurized products. The catalyst is of course employed in an amount sufficient to effect a significant increase in the rate of reaction at a given temperature and/or in the number of sulfur atoms introduced into the dialkyl sulfide molecule. Ordinarily, however, between about 0.1 and about 5 parts by weight of the catalyst is provided per 100 parts of the combined weights of the two reactants.

The reaction itself is most readily carried out simply by charging the two reactants and the catalyst to a suitable reaction vessel and thereafter heating the mixture under such conditions of time and temperature that at least one atom of the elemental sulfur combines chemically with each molecule of the dialkyl sulfide. As will be apparent, the minimum conditions of time and temperature will be governed by the ease with which the sulfide reactant combines with the sulfur and/or the number of sulfur atoms which is desired to be introduced into the dialkyl sulfide molecule. The maximum conditions are governed by the ease with which the sulfide reactant and/or the sulfurized product are decomposed. Ordinarily, however, the reaction temperature will be between about 100° C. and about 200° C., and the reaction time will be between about 0.5 and about 12 hours. The reaction pressure is usually atmospheric or the autogenic pressure of the reactants although higher pressures may be employed if desired. Also, if desired, the reaction may be effected in the presence of an inert liquid reaction medium, e.g., benzene, carbon tetrachloride, carbon disulfide, or the like, in order to promote intimate contact between the two reactants and the catalyst.

Upon completion of the reaction, the reaction product is filtered to separate off the catalyst and any unreacted sulfur. Conveniently, a small sample of the reaction product is cooled to about 0° C. to determine if any unreacted sulfur is contained therein. If such is the case the entire reaction product is cooled to about 0° C. prior to filtering; otherwise, it may advantageously be filtered hot. If the reaction has been carried out in the presence of an inert liquid reaction medium, the latter is removed by distillation or by stripping with an inert gas such as nitrogen. In most instances, the present process, like the prior art non-catalytic processes, produces a more or less complex mixture of individual sulfur-containing compounds. If desired, such mixture may be fractionated, usually under high vacuum, to separate individual or groups of individual compounds. However, for substantially all the known technical uses, such fractionation is unnecessary and in some cases may actually be undesirable; accordingly, the present process will not ordinarily include a step of separating the sulfurization product into individual compounds.

The following examples will illustrate several applications of the principle of the invention, but are not to be construed as limiting the same. All proportions are given in parts by weight.

Example I

A mixture of 160 parts of dimethyl trisulfide and 122 parts of sulfur is slowly heated to 120° C. and held at such temperature for several minutes, after which it is cooled to 0° C. Upon diluting the cooled mixture with a small amount of acetone substantially all of the sulfur precipitates, thereby indicating that very little chemical reaction has taken place between the sulfur and the dimethyl trisulfide. Approximately 1.5 parts of anhydrous zinc chloride are then added, and the mixture is heated to 130° C. and held at such temperature for about 5 minutes. The product so obtained is a heavy oil ($d^{28}$=1.440) from which substantially no free sulfur is precipitated upon cooling to 0° C. Its analysis corresponds to the formula $(CH_3)_2S_6$.

*Example II*

A mixture of 74 parts of dimethyl disulfide and 101 parts of sulfur is heated 135° C. for several minutes and then gradually cooled. When the mixture has cooled to about 90° C. sulfur begins to precipitate, and by the time the mixture has been cooled to room temperature substantially all of the sulfur present deposits. One part of anhydrous zinc chloride is then added, and the mixture is heated at reflux temperature (110°–150° C.) for 1 hour. The product so obtained is a clear yellow heavy oil ($d^{29}$=1.450) from which sulfur does not precipitate upon cooling to 0° C. Its analysis corresponds to the formula $(CH_3)_2S_6$.

*Example III*

A mixture of 122 parts of diethyl disulfide, 96 parts of sulfur and 5 parts of zinc bromide is placed in a rocking autoclave and heated at 150° C. for 2.5 hours. The reaction product is cooled, filtered to remove the catalyst and a small amount of free sulfur, and is then gas-stripped with nitrogen at 1 mm. pressure and atmospheric temperature. Analysis of the dark brown liquid product which is so obtained indicates it to be diethyl pentasulfide.

*Example IV*

A mixture of 516 parts of dimethyl disulfide, 160 parts of elemental sulfur, 27 parts of anhydrous zinc chloride, 188 parts of dimethyl disulfide recovered unreacted from a previous run, and 555 parts of a crude bottoms fraction recovered from a previous run is charged to a pressure vessel and heated at about 150° C. for about 2 hours under the autogenic pressure of about 50 p.s.i.g. The reaction product is then transferred to a distillation vessel and distilled under 40 mm. pressure to obtain the aforesaid crude bottoms fraction boiling above 160° C. and an overhead fraction distilling below about 160° C. The overhead fraction is transferred to a second distillation vessel and distilled under 40 mm. pressure to obtain about 630 parts of a bottoms product distilling above about 80° C. and having an analysis corresponding to $(CH_3)_2S_3$. The overhead fraction is condensed, passed to a liquid-vapor separator, and the liquid phase is recovered as unreacted dimethyl disulfide.

*Example V*

Approximately 594 parts of an equimolecular mixture of dimethyl disulfide and diethyl disulfide, 320 parts of elemental sulfur, and 27 parts of anhydrous zinc chloride are heated at 150° C. for 2 hours under 50 p.s.i.g. pressure. The reaction product is transferred to a still and distilled at 40 mm. pressure to recover a crude product ovehead fraction boiling below about 160 C., and the latter is redistilled under reduced pressure to recover a mixed dimethyl polysulfide and diethyl polysulfide product averaging 3 atoms of sulfur per molecule and distilling above about 95° C. under 40 mm. pressure.

*Example VI*

A mixture comprising one mole of isopropyl dodecyl sulfide, 8 moles of sulfur and 0.02 moles of anhydrous boron trifluoride is heated at about 190° C. for 1 hour. The reaction product is diluted with an equal volume of carbon tetrachloride, chilled to about 0° C., and filtered to remove a small amount of unreacted sulfur. The filtrate is then distilled under vacuum to remove low-boiling by-products and recover an isopropyl dodecyl polysulfide product containing an average of about 8.5 sulfur atoms per molecule. Similar results are obtained employing mercuric chloride as the catalyst.

*Example VII*

A mixture of one mole of di-n-octyl tetrasulfide, 2 moles of elemental sulfur, and 0.01 mole of anhydrous aluminum chloride is heated at 180° C. for 4 hours. The crude reaction product is gas-stripped with dry nitrogen at 100° C. under 40 mm. pressure to obtain a di-n-octyl polysulfide product containing an average of 6 atoms of sulfur per molecule.

*Example VIII*

Example VII is repeated, substituting ferric bromide for the aluminum chloride catalyst. Substantially identical results are obtained.

Other modes of applying the principle of my invention may be employed instead of those explained, change being made as regards the methods or materials employed, provided the step or steps stated by any of the following claims, or the equivalent of such stated step or steps, be employed.

I, therefore, particularly point out and distinctly claim as my invention:

1. In a process wherein a dialkyl sulfide of the general formula

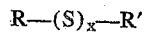

wherein R and R' each represents an alkyl radical and $x$ represents an integer between 1 and 4, inclusive, is reacted with a molal excess of elemental sulfur under such conditions of time and temperature to effect the formation of a sulfurized product containing greater than one atom more of chemically bound sulfur per mole of product than said dialkyl sulfide, the improvement which consists in carrying out said reaction in the presence of a catalytic amount of a Friedel-Crafts catalysts.

2. A process according to claim 1 wherein the said catalyst is a zinc halide.

3. A process according to claim 1 wherein said dialkyl sulfide is selected from the class consisting of dimethyl sulfide, diethyl sulfide, and mixtures of the same.

4. A process according to claim 3 wherein the said catalyst is anhydrous zinc chloride.

5. The process which comprises heating a dialkyl sulfide of the general formula

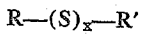

wherein R and R' each represents an alkyl radical and $x$ represents an integer between 1 and 4, inclusive, with a molal excess of elemental sulfur in the presence of a catalytic amount of a Friedel-Crafts catalyst and at a temperature between about 100° C. and about 200° C. for a period of time such that more than one atom of said sulfur combines per mole of dialkyl sulfide in such manner that it fails to precipitate when the reaction product is cooled to a temperature of about 0° C.

6. The process of claim 5 wherein the said catalyst is a zinc halide.

7. The process of claim 5 wherein the said heating is effected under the autogenic pressure.

8. The process of claim 5 wherein between about 1 and about 15 atomic weights of sulfur are provided for each molecular weight of said dialkyl sulfide.

9. The process of claim 5 wherein the said dialkyl sulfide is selected from the class consisting of dimethyl sulfide, diethyl sulfide and mixtures of the same.

10. The process of claim 9 wherein the said catalyst is a zinc halide.

11. The process of claim 9 wherein the said catalyst is anhydrous zinc chloride.

References Cited in the file of this patent

UNITED STATES PATENTS

| | | |
|---|---|---|
| 2,841,518 | Webb et al. | July 1, 1958 |
| 2,882,197 | Webb et al. | Apr. 17, 1959 |

OTHER REFERENCES

Kraft et al.: Ber. Deut. Chem. 29, 435–436 (1896).
Holmberg: Liebig's Annaln 359, 81–99 (1908).
Boesken et al.: Chem. Abs. 5, 3399 (1911).
C. A. Thomas: Anhydrous Aluminum Chloride in Organic Chemistry, A. C. S. Monograph Series No. 87, p. 164 (1941), Reinhold Pub. Co., New York, N.Y.